United States Patent [19]
Kiernan et al.

[11] 4,262,362
[45] Apr. 14, 1981

[54] FIBER OPTICS DUPLEX MODULE

[75] Inventors: Sherwood C. Kiernan, Woodbine; James A. Henderson, Finksburg, both of Md.

[73] Assignee: Westinghouse Electric Corp., Pittsburgh, Pa.

[21] Appl. No.: 952,373

[22] Filed: Oct. 18, 1978

[51] Int. Cl.³ ............................................. H04B 9/00
[52] U.S. Cl. ................................ 455/612; 350/96.15; 350/96.21
[58] Field of Search ..................... 250/199; 350/96.15, 350/96.16, 96.17, 96.20, 96.21; 358/901; 455/612, 610

[56] References Cited
U.S. PATENT DOCUMENTS

| | | | |
|---|---|---|---|
| 3,297,875 | 1/1967 | Garwin et al. | 250/199 |
| 3,953,727 | 4/1976 | d'Avria et al. | 250/199 |
| 4,158,477 | 6/1979 | Phillips et al. | 350/96.21 |

FOREIGN PATENT DOCUMENTS 2260842  6/1973  Fed. Rep. of Germany ........ 350/96.15
2333910  2/1974  Fed. Rep. of Germany ........ 350/96.15

OTHER PUBLICATIONS d'Auria et al., Composants pour Liaisons par Faisceaux des Fibres Optiques Revue Technique Thompson CSF, vol. 7, #4, Dec. 1975, pp. 651–658.

*Primary Examiner*—Robert L. Griffin
*Assistant Examiner*—Joseph A. Orsino, Jr.
*Attorney, Agent, or Firm*—J. B. Hinson

[57] ABSTRACT

A duplex module for simultaneous bidirectional transmit-receive communication with the end of an optical fiber or fiber bundle. The end face of an optical fiber in optical coupling registry with one end of a common bidirectional transmit-receive optical path is tilted to divert any transmit signal back-reflected from such end out of such path. The other end of the transmit-receive path is affiliated with signal receiver and transmitter means via a beam splitter.

4 Claims, 1 Drawing Figure

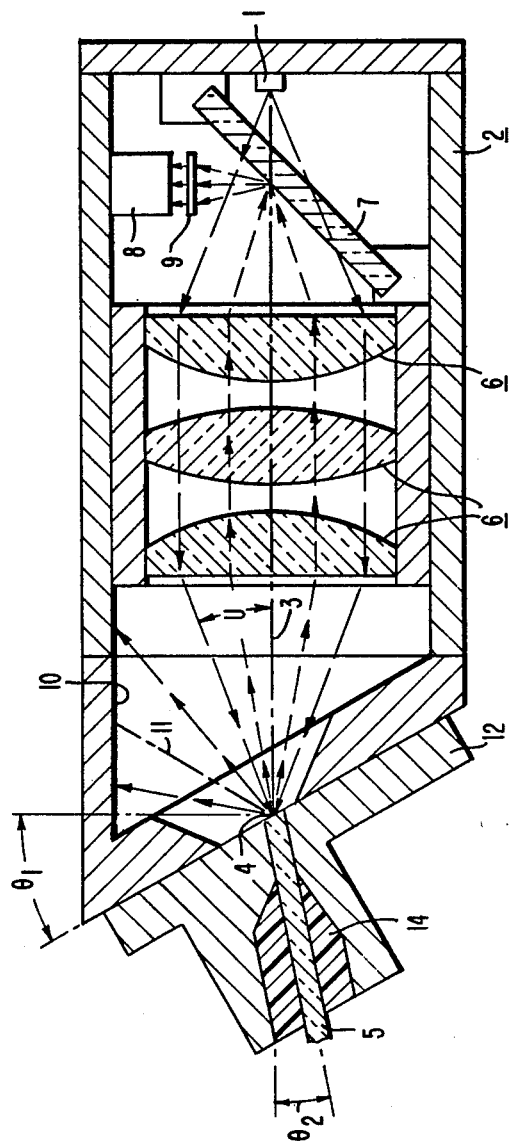

FIBER OPTICS DUPLEX MODULE

BACKGROUND OF THE INVENTION

This invention relates to a fiber optics duplex module for bidirectional simultaneous transmission and receipt of light signals to and from a common optical fiber channel or link, and more particularly to such a module in which crosstalk between the transmitter and receiver is minimized.

Communication via optical fibers is a rapidly developing technology, as exemplified in U.S. Pat. No. 3,953,727. Advantages of using optical fibers versus conventional microwave cables are many, but most significant are the weight and volume reductions which can be realized. In spite of the greater capabilities of an optical fiber communication system, present schemes do not utilize the full system capacities due to the inherent problem of crosstalk between transmit and receive signals when using a common optical channel.

In order to obtain satisfactory levels of isolation between the transmitter and the receiver at the end of an optical fiber link, techniques are employed which effectively reduce the efficiency of the system to fifty percent or less of its full potential. One of these techniques is the use of separate fiber links for the transmit and receive channels. Another method employed is time multiplexing wherein the receiver is turned off while the transmitter is broadcasting and vice-versa.

If a common fiber or fiber bundle can be used to simultaneously transmit and receive signals, the efficiency of operation of the system can be significantly improved. The problem has been, however, the high degree of isolation between the transmit and receive signals that is required in order to enable use of such a duplex system in a long-range application where any spillover or crosstalk from the transmit signal would tend to swamp out the relatively weak receive signal characteristic of such long-range use. The duplex module of the present invention is aimed at greatly reducing, if not eliminating, the primary source of crosstalk between the transmitter and the receiver in behalf of affording such bidirectional simultaneous communication by way of an optical fiber link of lengths heretofore considered to be impractical.

SUMMARY OF THE INVENTION

The duplex module of the present invention employs a relay lens means for bidirectional transmission of signals along a common transmit-receive signal path between the end of an optical fiber and a signal transmitter aligned with such common path as well as a receiver arranged at right-angles to such path; a beam splitter being arranged to direct the transmit and receive signals from the common path to the signal receiver and from the transmitter to such common signal path. The prime feature of the present invention resides in preventing the transmit signal from reflecting off the end of the optical fiber back into the common transmit-receive signal path. This objective is obtained by sloping the end face of the fiber relative to the center of the common signal path to divert any such back reflections out of such common path and toward a signal absorbing surface within the housing of the module. At the same time the optical fiber is mounted to extend at an angle relative to the central axis of the common transmit-receive signal path, optical axis, to obtain proper registry of the end of such optical fiber with such axis for effective bidirectional signal coupling therebetween.

BRIEF DESCRIPTION OF THE DRAWINGS

While the specification concludes with claims particularly pointing out and distinctly claiming the subject matter of the invention, it is believed that the invention will be better understood from the following description taken in conjunction with the accompanying drawing, wherein the single FIGURE is a substantially cross-sectional view of an optical fiber duplex module embodying the present invention.

DESCRIPTION OF THE PREFERRED EMBODIMENT

Where a communication system might be expected to work over a long distance such as two kilometers or more, for example, a strong transmitter signal will be desired to help overcome the signal losses that result from transmission through even the best of optical fibers. Consequently, at the receiver the incoming signals can be many orders of magnitude lower than the adjacent transmitter signal levels. It is imperative, therefore, that the signal from the transmitter be prevented from entering the adjacent receiver channel. The present invention provides for such isolation while the transmitter and the receiver are operating simultaneously.

Referring to the drawing, the duplex module of the present invention includes an optical signal transmitter 1 disposed within a housing 2 and arranged to transmit a signal of a chosen wavelength along the beam path having a central axis of symmetry 3 to the terminal end 4 of an optical fiber 5 by way of a relay lens means 6 in such path. At the same time, optical signals of a different wavelength, receive signals, leave the optical fiber 5 at its termination end 4 and travel along the path defined by the center axis 3 and through the relay lens means 6 toward the transmitter 1 where a beam splitter 7 diverts such receive signals obliquely from the common transmit-receive signal path to a receiver 8 by way of a filter 9.

Many of various sources of crosstalk between the transmit and receive signals can be significantly and effectively reduced by conventional design practices (not shown). The strongest source of crosstalk, however, tends to occur as a result of back reflection of the transmit signal from the terminus end 4 of the optical fiber 5 into the common transmit-receive signal path centered on axis 3. In spite of the quality of the beam splitter 7, it can be expected that typically 1% or more of the transmit signal back-reflected from the fiber end 4 to such beam splitter can be expected to be diverted toward the receiver 8.

In accord with the present invention, backscatter from the terminating end 4 of the optical fiber 5 is significantly reduced, if not completely eliminated, in behalf of enabling such fiber 5 to simultaneously accommodate bidirectional propagation of the transmit and receive signals, respectively. This is accomplished by providing a highly polished end surface 4 on such optical fiber 5 that is tilted to divert any such back reflection of the transmit signal away from the transmit-receive-signal path centered on the axis 3 and toward a signal absorbing surface 10 at the interior of the housing means 2. In the drawing, a dot-and-dash line 11 indicates the central axis of such diverted transmit-signal-back-reflection path. Also, as indicated in the drawing the symbol $\theta_1$ indicates the angle of tilt of the terminus end 4 of the optical fiber 5 relative to perpendicularity with respect to the center axis 3 of the common transmit-receive signal path. It will be appreciated that the center of the tilted end 4 of the optical fiber 5 will coincide with the center or optical axis 3 of the transmit-receive signal path.

In compensation for the effect of the backscatter-diverting tilt of the end face 4 of the optical fiber 5, such optical fiber is mounted such that its central axis is at an angle $\theta_2$ with respect to the optical axis 3 of the common transmit-receive signal path. This is to assure efficient optical coupling between such path 3 and the optical fiber means. $\theta_2$ expressed in terms of $\theta_1$, and $n_2$ and $n_1$ the index of refraction of the optical fiber 5 and housing 2 interior respectively, is equal to $\sin^{-1}[(n_2 - n_1/n_2) \sin \delta_1]$. A suitably shaped ferrule member 12 removably attached to the housing means 2 can serve to properly mount the terminus end 4 of the optical fiber 5 during its use while mounted on such housing means as well as possibly during polishing of such terminus end of the fiber means during fabrication prior to use. A suitable bonding material 14 disposed in a cavity within the ferrule member 12 can be employed to mount the optical fiber securely therein.

The present invention can be employed to advantage to enable a single optical fiber, or single fiber bundle, to function in the simultaneous bidirectional mode of signal propagation, together with conventional techiques for crosstalk reduction such as: enclosing the transmitter to reduce stray light radiations; reducing and/or eliminating component cross-sections that can be viewed by both the receiver 8 and the transmitter 1; using the so-called "black hole" technique behind the beam splitter; baffling the region around the receiver 8; providing anti-reflection coating on the elements of the relay lens means 6; and, using rejection filters at appropriate sites.

A model of a fiber optics duplex module embodying the features of the present invention as well as the other suppression techniques discussed above obtained a ten-to-one reduction in system crosstalk levels at 0.67 microns wavelength in comparison with such a module with the terminal face of the optical fiber at right angles to the optical axis 3.

Having now described the invention, what is claimed as new and desired to be secured by Letters Patent is:

1. A fiber optic assembly comprising:
   (a) a duplex optical path for simultaneous bidirectional transmission of optical signals, said optical path including:
      (1) lens means having first and second ends for receiving a light beam of a first wavelength along a transmit path parallel to the optical axis of said lens means and for focussing said input beam at a point along said optical axis of said lens means such that said lens means is disposed between the source providing said light beam and said point at which said beam is focussed;
      (2) beam splitter means positioned in said optical path and between the source providing said light beam of said first wavelength and said first end of said lens means, said beam splitter characteristics being selected to reflect a return light signal of a second wavelength from said lens means to detector means; and
   (b) an optical fiber link having an end face tilted at an angle $\theta_1$ relative to a line perpendicular to the axis of said optical path, in effective optical coupling registry with one end of said optical path via a medium having an index of refraction $n_1$, said optical fiber link having an index of refraction $n_2$, where $n_2$ is different from $n_1$, being tilted at an angle $\theta_2$ relative to a line perpendicular to the central axis of said optical path, wherein
   $\theta_2 = \sin^{-1}[(n_2 - n_1/n_2) \sin \theta_1]$.

2. A fiber optics assembly as set forth in claim 1, further comprising means for absorbing backscatter diverted from said tilted end face.

3. The assembly of claim 1, further including transmit-and-receive signal means optically coupled to the opposite end of said optical path.

4. The assembly of claim 3, wherein said transmit-and-receive signal means includes a beam splitter means.

* * * * *